United States Patent [19]

Kojima

[11] Patent Number: 5,509,107
[45] Date of Patent: Apr. 16, 1996

[54] CHARACTER PRINTER

[75] Inventor: Yasumichi Kojima, Nagoya, Japan

[73] Assignee: Brother Kogyo Kabushiki Kaisha, Nagoya, Japan

[21] Appl. No.: 103,765

[22] Filed: Aug. 10, 1993

[30] Foreign Application Priority Data

Nov. 30, 1992 [JP] Japan ..................... 4-345190

[51] Int. Cl.⁶ ..................... G06F 15/00
[52] U.S. Cl. ..................... 395/113; 395/112
[58] Field of Search ..................... 395/112, 113, 395/114, 101, 117, 155, 156; 355/203, 204, 205, 206, 207, 208, 209; 400/103; 358/400, 404, 406, 444, 296; 347/19, 142

[56] References Cited

U.S. PATENT DOCUMENTS 4,661,001  4/1987  Takai et al. ..................... 400/103
5,200,958  4/1993  Hamilton et al. ..................... 371/16.4
5,270,774  12/1993  Kikuchi ..................... 355/203
5,382,105  1/1995  Iguchi et al. ..................... 400/621

FOREIGN PATENT DOCUMENTS 54-142037  11/1979  Japan .

Primary Examiner—Raymond J. Bayerl
Assistant Examiner—Dov Popovici
Attorney, Agent, or Firm—Oliff & Berridge

[57] ABSTRACT

A character printer is designed to initiate the routine of test mode processing when the printer is turned on, with its TEST key being kept pressed. The routine initially sets 0 to the argument N, which represents the test mode number, and the program proceeds to Test Mode Display subroutine. The operator presses the down key, up key or SET key to select an intended test mode among multiple test modes, and the test program of the selected test mode is executed by a Test Program Execution subroutine.

20 Claims, 5 Drawing Sheets

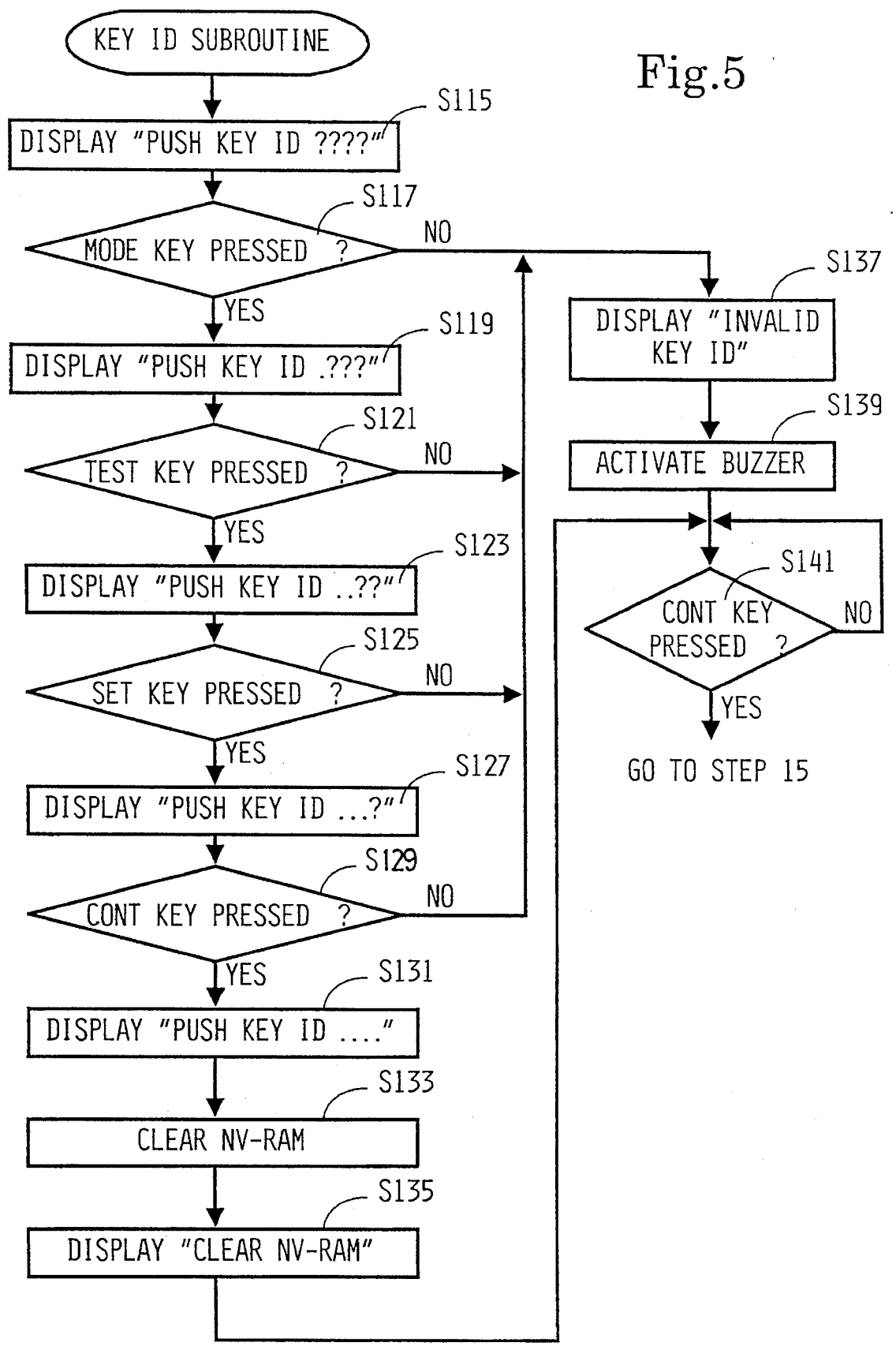

CHARACTER PRINTER

BACKGROUND OF THE INVENTION

1. Field of the Invention

The present invention relates to a character printer, and more particularly, to a character printer with the ability of preventing the printer from entering into a test mode unintentionally during the usual key operation.

2. Description of the Related Art

For a compact character printer incorporating a test program, it is not desirable to have a special key dedicated to the initiation of the test program. Therefore, conventional printers of this type are designed to enter into the test mode by use of some keys that are commonly used in the normal operation mode. Generally, a rule of key operation for bringing the printer into the test mode is established based on a program so that the printer does not enter into the test mode unintentionally during the usual key operation. However, it is not desirable either to prepare a special program for establishing the test mode setting rule.

There has been proposed a procedure of initiating a test program in such a manner that the power switch is turned on while a specific function key is kept pressed, as described in Japanese Patent Laid-open No. Sho 54-142037. According to this method, the rule of test program initiation can he included in the existing power control program, and it does not necessitate a special program.

However, recent character printers have a growing number of operational functions that necessitate individual test programs. The number of function keys is limited, and it is difficult for the operator to remember and use the function keys correctly to test corresponding functions. Moreover, this method is not capable of allowing only specific operators to run certain test programs.

SUMMARY OF THE INVENTION

An object of the present invention is to provide a character printer capable of allowing the operator to run the test program of an intended test mode selectively among a plurality of test modes in a simple manner of operation, while preventing the printer from entering into any test mode unintentionally.

Another object of the present invention is to provide a character printer capable of allowing the operator to run the test programs of certain test modes only through a predetermined sequence of key operations.

In order to achieve the first objective, the character printer based on this invention comprises a plurality of function keys, display means for displaying the state of the printer and the printer setup condition, test program execution means for running test programs of test modes provided individually for a plurality of operational functions of the printer, test mode display means for displaying the test modes on the display means in response to the operation of a first predetermined function key among the multiple function keys at the power-on operation, test mode selection means for selecting one of the test modes in response to the operation of a second predetermined function key, and control means for operating on the test program execution means to run the test program of the test mode selected by the test mode selection means.

In order to achieve the second objective, the control means operates on the test program execution means to run the test program of test mode selected by the test mode selection means only after the operator operates a plurality of predetermined function keys in a prescribed sequence.

According to the above-mentioned arrangement of the inventive character printer, the test mode display means displays the multiple test modes on the display means when the operator operates the first predetermined function key among multiple function keys at the power-on operation. In response to the operation of the second predetermined function key, the test mode selection means selects one of the multiple test modes and the control means operates on the test program execution means to run the test program of the selected test mode. For certain test modes, the test program execution means runs the test program of the test mode selected by the test mode selection means only after the operator operates the predetermined function keys in the prescribed sequence.

Consequently, the inventive character printer allows the operator to select one of the test modes that are displayed on the display means and run the test program of the selected test mode in a simple manner of operation, while preventing the printer from entering into any test mode unintentionally. The test programs of certain test modes can be run only in response to the sequential operation of predetermined function keys known by specific operators.

BRIEF DESCRIPTION OF THE DRAWINGS

FIG. 5 is a flowchart of the Key ID subroutine of the printer control program based on this embodiment.

DESCRIPTION OF A PREFERRED EMBODIMENT

A specific embodiment of the present invention will be explained with reference to the drawings.

Figure 1:
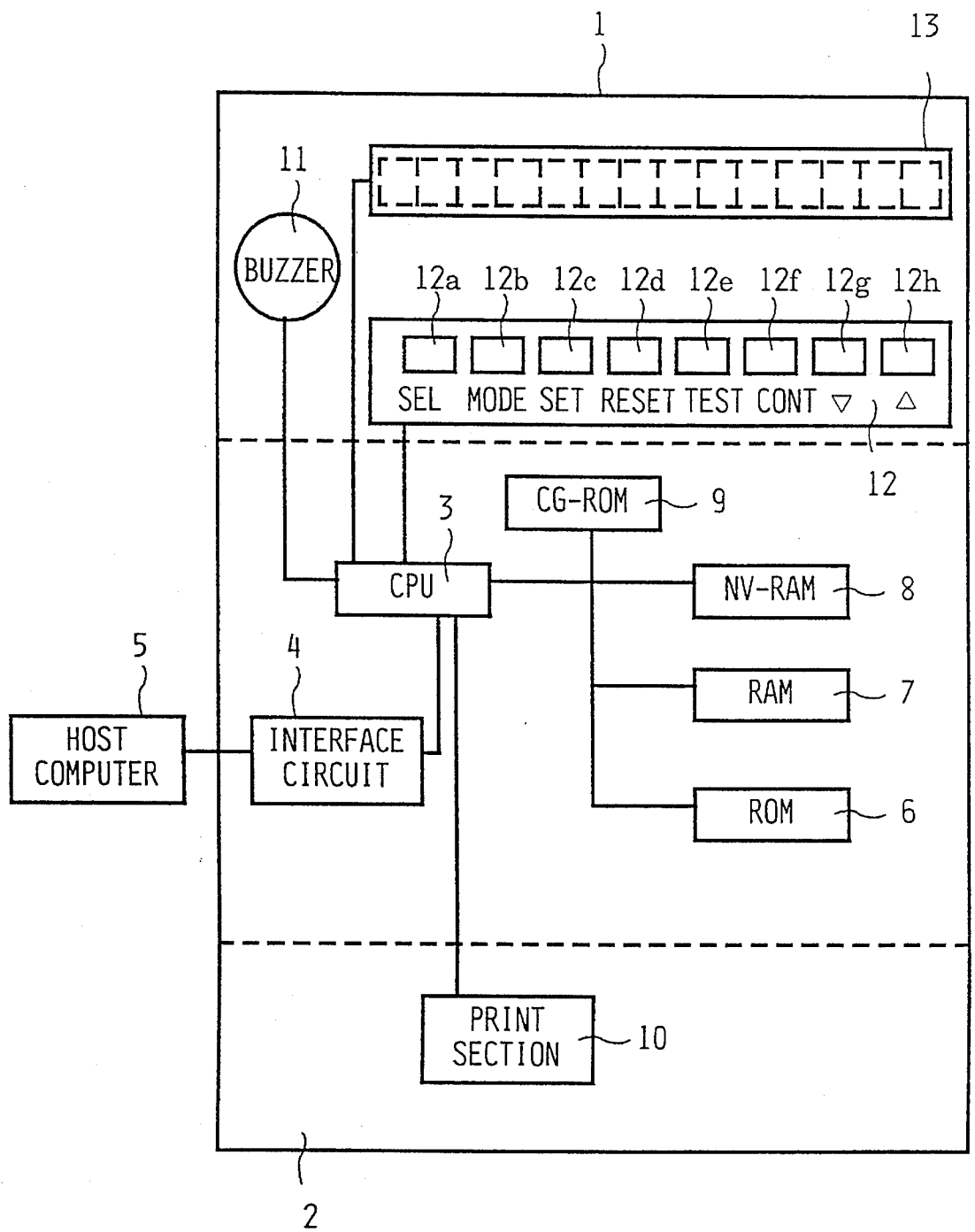
FIG. 1 is a block diagram showing the principal arrangement of the character printer based on an embodiment of this invention.

In FIG. 1, a character printer 1 based on this embodiment of the invention includes a control section 2, which is basically a microcomputer, in which a CPU 3 is connected to an external host computer 5 through an interface circuit 4 and adapted to receive print data from host computer 5. The CPU 3 is connected in the control section 2 with a ROM 6, which stores a control program for controlling the entire printer 1, a RAM 7, which stores print data received from the host computer 5, a nonvolatile memory device (NV-RAM) 8, and a character generator (CG-ROM) 9, which stores character patterns. Further connected to the CPU 3 are a print section 10, a buzzer 11, which emits a sound to prompt the operator to take a key operation, a set of function keys 12 that can be operated by the operator, and a display device 13, which displays data entered through the operation of the function keys 12.

In the character printer 1 arranged as described above, the CPU 3 operates in accordance with the control program stored in the ROM 6 to store, in the RAM 7, print data that has been received from the host computer 5 by way of the interface circuit 4, convert the print data into dot data for printing and control the print section 10 to print characters of the print data. The CPU 3 scans the function keys 12, reads character data out of the CG-ROM 9 and displays it on the display device 13 in response to the detected key operation, and controls the activation of the buzzer 11. The CPU 3 further operates to store various printer setup information selected by use of the function keys 12, which include the paper size, print position, number of prints, font of character, interface mode, etc., in the NV-RAM 8.

Figure 2:
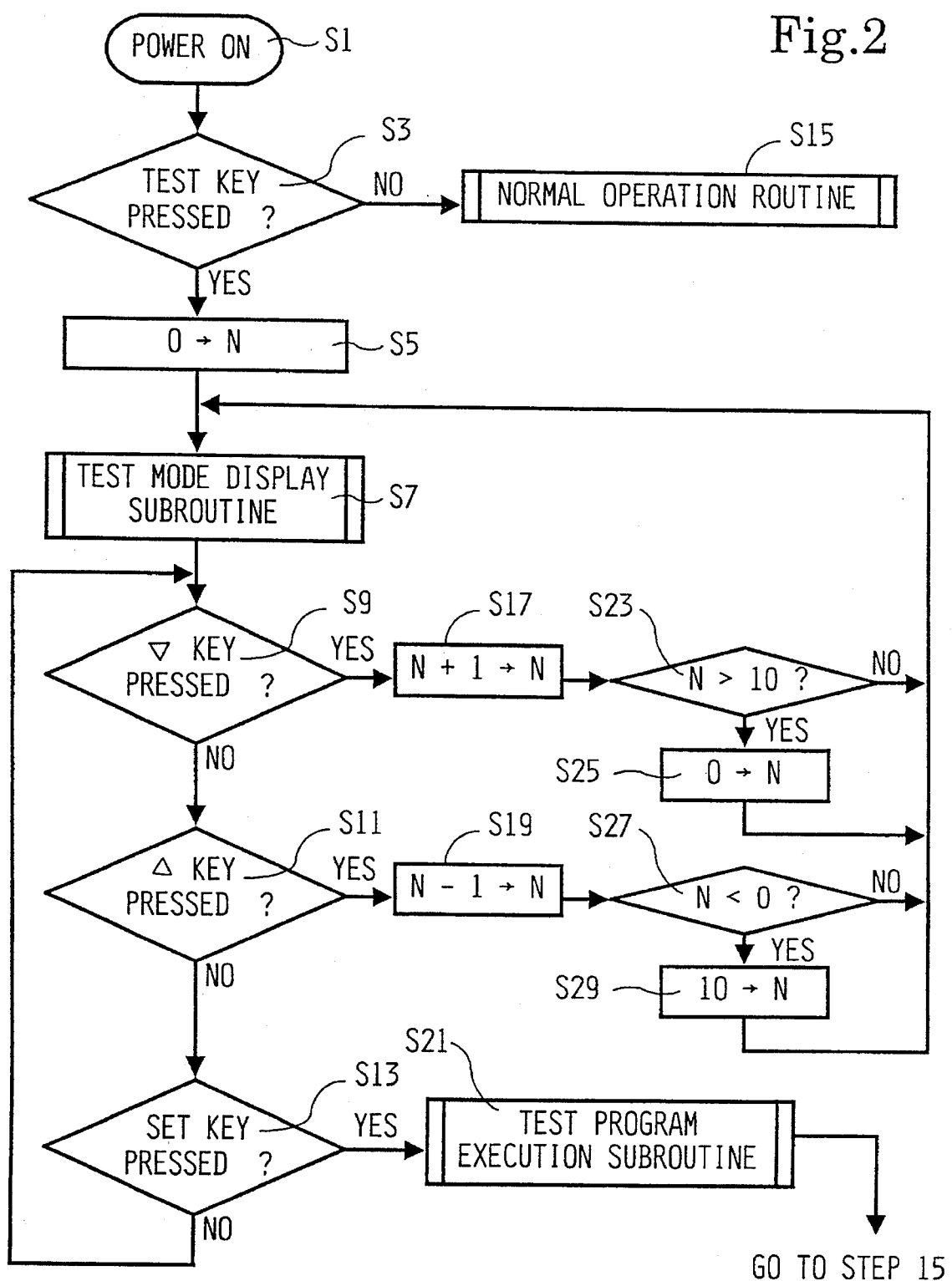
FIG. 2 is a flowchart of the main routine of the printer control program based on this embodiment.

FIG. 2 shows a flowchart of the main routine of the printer control program stored in the ROM 6. The main routine is initiated by the CPU 3 immediately after the printer 1 has been turned on.

At the beginning (step 1), it is tested whether or not the TEST key 12e among the function keys 12 is being pressed (step 3). Unless the key 12e is being pressed, the program proceeds to Normal Operation routine (step 15). When the power switch of the printer 1 is turned on, with the TEST key 12e being kept pressed, the program proceeds to the routine of test mode processing. Initially, in this routine, an argument N, which represents the test mode number, is set to 0 (step 5). The program proceeds to Test Mode Display subroutine, by which a test mode corresponding to the value of the argument N is displayed on the display device 13 (step 7).

Figure 3:
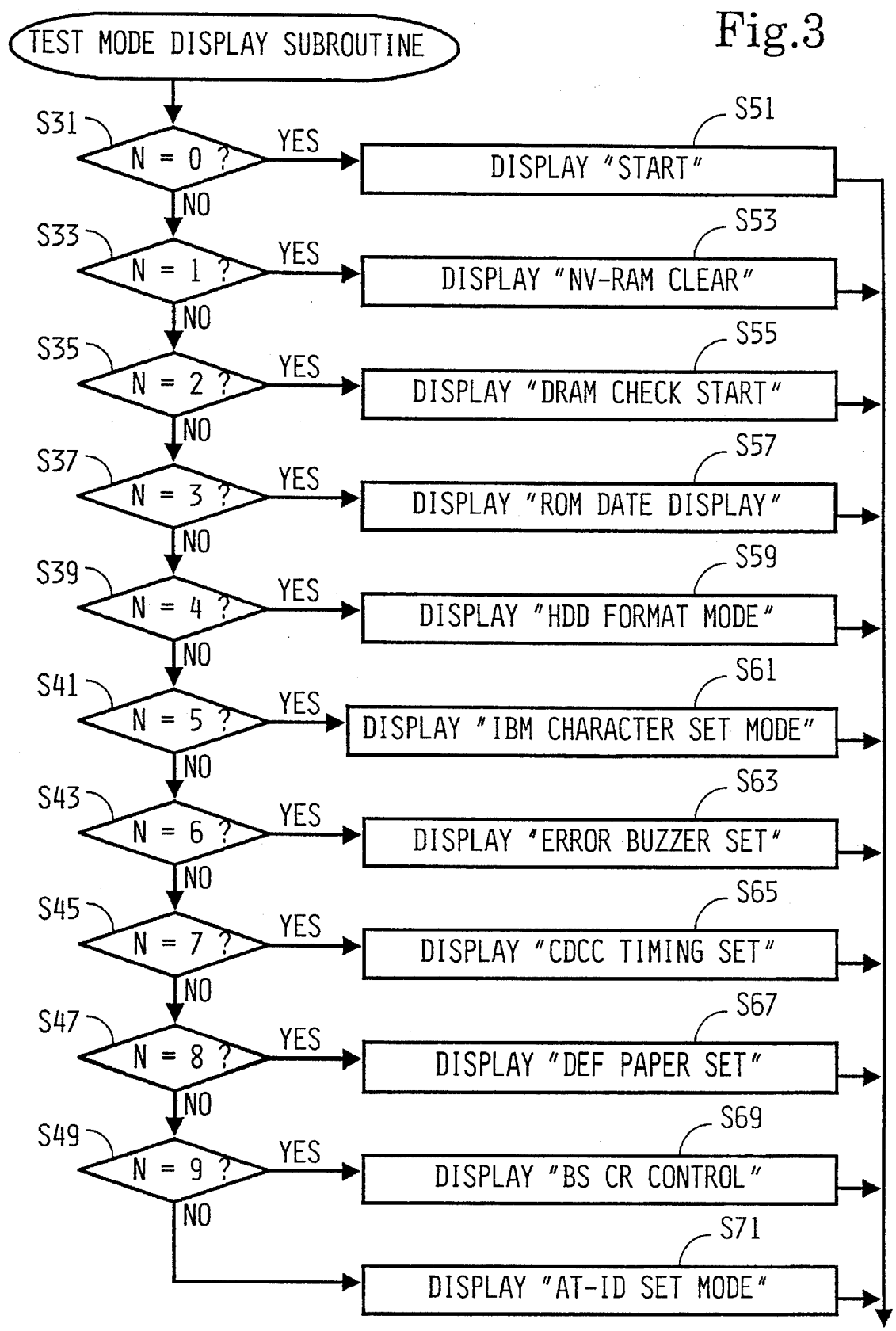
FIG. 3 is a flowchart of the Test Mode Display subroutine of the printer control program based on this embodiment.

The Test Mode Display subroutine will be explained on the flowchart of FIG. 3. Initially, it is tested whether or not the value of argument N is 0 (step 31). If N is 0, the CPU 3 reads character data of "START" from the CG-ROM 9 and sends it to the display device 13. The Test Mode Display subroutine terminates on displaying "START" on the display device 13 (step 51), and the program returns to step 9 of the main routine of FIG. 2.

If the argument N is not 0 in step 5, it is tested whether or not N is 1 (step 33). If N is 1, the CPU 3 reads character data of "NV-RAM CLEAR" from the CG-ROM 9 and sends it to the display device 13 (step 53). The Test Mode Display subroutine terminates, and the program returns to step 9 of the main routine.

If the argument N is not 1, it is tested whether or not N is 2 (step 35), and in the same manner the CPU 3 reads character data corresponding to the value of argument N from the CG-ROM 9 and sends it to the display device 13, i.e., "DRAM CHECK START" for N=2 (steps 35, 55), "ROM DATE DISPLAY" for N=3 (steps 37, 57), "HDD FORMAT MODE" for N=4 (steps 39, 59), "IBM CHARACTER SET MODE" for N=5 (steps 41, 61), "ERROR BUZZER SET" for N=6 (steps 43, 63), "CDCC TIMING SET" for N=7 (steps 45, 65), "DEF PAPER SET" for N=8 (steps 47, 67), or "BS CR CONTROL" for N=9 (steps 49, 69). If the argument N is not 9 in step 49, the Test Mode Display subroutine terminates on displaying "AT-ID SET MODE" (step 71), and the program returns to step 9 of the main routine of FIG. 2.

In step 9 of the main routine, it is tested whether or not an up key 12g (Δ) is being pressed. If the up key 12g is found pressed, the argument N is incremented by one (step 17). If the resulting value is greater than 10 (step 23), it is reset to 0 (step 25) and the program returns to Test Mode Display subroutine, which is step 7 in the main routine, or otherwise the program simply returns to step 7.

If the operation of the up key 12g is not detected in step 9, it is tested whether or not a down key 12h (∇) is being pressed (step 11). If the down key 12h is found pressed, the argument N is decremented by one (step 19). If the resulting value is smaller than 0 (step 27), it is set to 10 (step 29) and the program returns to step 7, or otherwise the program simply returns to step 7.

If the operation of the down key 12h is not detected in step 11, it is tested whether or not a SET key 12c is being pressed (step 13). If the key 12c is found pressed, the program proceeds to Test Program Execution subroutine (step 21), or otherwise the program returns to step 9 and the judgment of steps 9, 11 and 13 are repeated until any of the up key 12g, down key 12h and SET key 12c is pressed.

Figure 4:
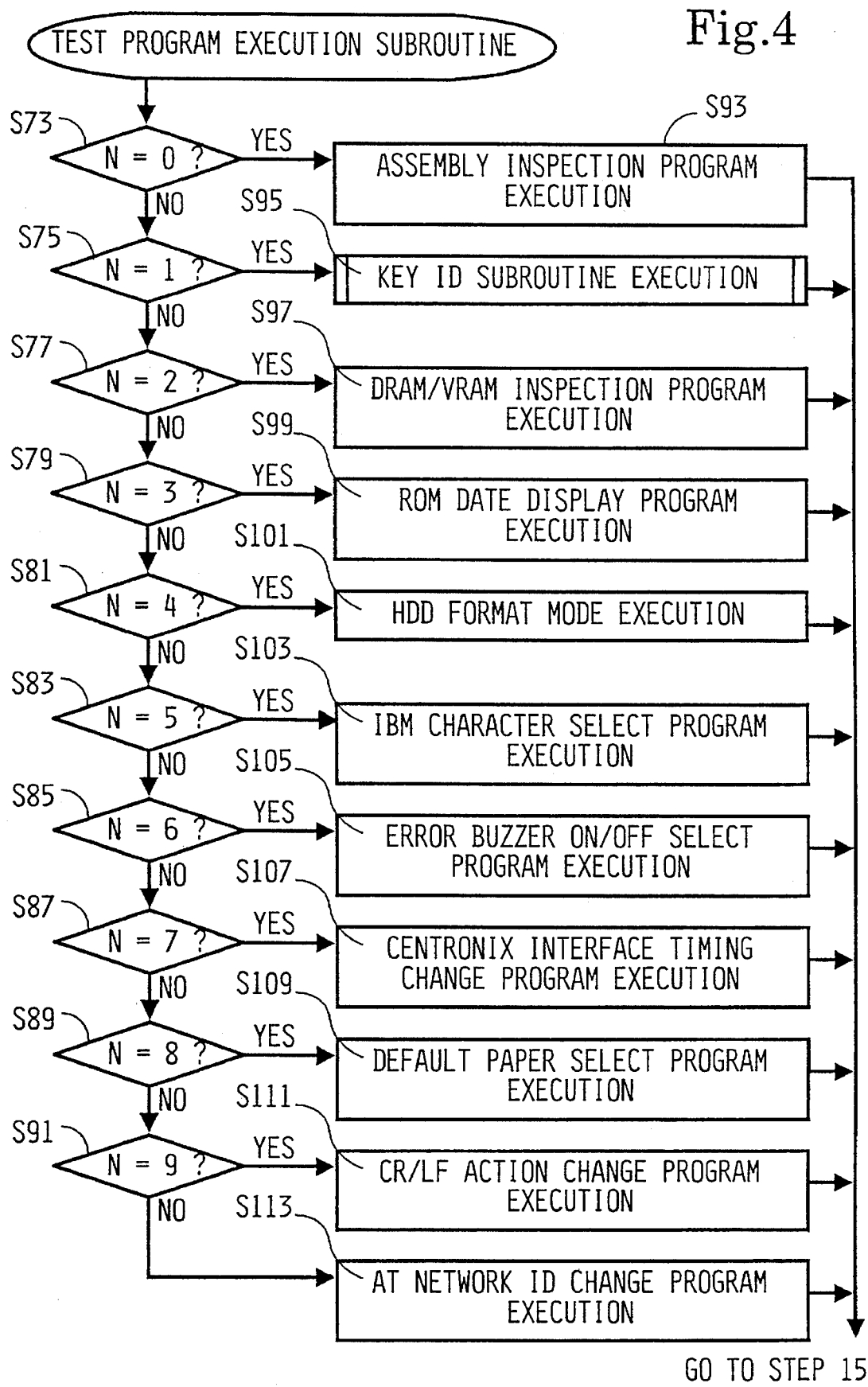
FIG. 4 is a flowchart of the Test Program Execution subroutine of the printer control program based on this embodiment.

The Test Program Execution subroutine, which is step 21 in the main routine will be explained on the flowchart of FIG. 4. Initially, it is tested whether or not the value of argument N is 0 (step 73). If the value is 0, the CPU 3 reads out from the ROM 6 a test program of assembly inspection mode for inspecting the print quality by printing a certain character pattern, and delivers it to the display device 13 and print section 10 (step 93). On completion of the process of this program, the Test Program Execution subroutine terminates, and the program proceeds to the Normal Operation routine (step 15).

If the argument N is not 0, it is tested whether or not N is 1 (step 75), and if N is 1, the program proceeds to the Key ID subroutine (step 95), which will be explained later.

If the argument N is not 1 in step 75, it is tested whether or not N is 2 (step 77), and if N is 2, the CPU 3 reads out the test program of DRAM/VRAM inspection mode from the ROM 6, and delivers it to the display device 13 and print section 10 (step 97). On completion of this program, the Test Program Execution subroutine terminates and the program proceeds to the Normal Operation routine (step 15).

If the argument N is not 2, it is tested whether or not N is 3 (step 39), and in the same manner, the CPU 3 reads a test program corresponding to the value of argument N from the ROM 6 and sends it to the display device 13, i.e., the test program of ROM write date display mode for N=3 (steps 79, 99), the test program of HDD format mode for N=4 (steps 81, 101), the test program of IBM character (E1h) selection mode for N=5 (steps 83, 103), the test program of error warning buzzer on/off selection mode for N=6 (steps 85, 105), the test program of Centronix interface signal timing change mode for N=7 (steps 87, 107), the test program of default paper selection mode for N=8 (steps 89, 109), the test program of CR/LF code action change mode for N=9 (steps 91, 111), or the test program of AT network ID change mode for N other than 0 through 9 (steps 91, 113). On completion of the process, the Test Program Execution subroutine terminates and the program proceeds to the Normal Operation routine (step 15).

Next, the Key ID subroutine, which is step 95 in the Test Program Execution subroutine, will be explained on the flowchart of FIG. 5. Initially, the CPU 3 reads out character data for "PUSH KEY ID ????" from the CG-ROM 9 and delivers the data to the display device 13 (step 115). It is tested whether or not the MODE key 12b is pressed within the prescribed time length (step 117). CPU 3 includes a timer for signaling the end of the prescribed time length, which is preferably about 5–10 seconds. On detecting the operation of the key 12b, the CPU 3 reads out data from the CG-ROM 9 to the display device 13, and "PUSH KEY ID .???" is displayed on the display device 13 (step 119). Subsequently, "PUSH KEY ID ..??" is displayed on detecting the operation of the TEST key 12e within the prescribed time length (step 123), and "PUSH KEY ID ...?" is displayed in response to the operation of the SET key 12c, and "PUSH KEY ID . . . " is displayed (step 131) in response to the operation of the CONT key 12f (step 129), and the program sequence proceeds to step 133.

In step 133, the contents of the NV-RAM 8, which stores printer setup information such as the paper size, print position, number of prints, character font, interface mode, etc., is cleared. Subsequently, the CPU 3 reads out character data for "CLEAR NV-RAM" from the CG-ROM 9 and delivers it to the display device 13 (step 135). On detecting the operation of the CONT key 12f in the subsequent step 141, the Key ID subroutine terminates, and the program proceeds to the Normal Operation routine (step 15).

In case the MODE key 12b, TEST key 12e, SET key 12c and CONT key 12f are not pressed within the prescribed time length in steps 117, 121, 125 and 129, respectively, the CPU 3 reads out character data for "INVALID KEY ID" from the CG-ROM 9 and delivers it to the display device 13 (step 137) and activates the buzzer 11 in accordance with the control program in the ROM 6 (step 139). On detecting the operation of the CONT key 12f in step 141, the Key ID subroutine terminates, and the program proceeds to the Normal Operation routine (step 15).

As described above, the main routine branches to the routine of test mode processing only when the power switch of the printer 1 is turned on, with the TEST key 12e being kept pressed, and the test mode items are displayed on the display device 13, instead of direct execution of a test program. Consequently, the printer is prevented from entering into the execution of test program unintentionally, and the operator is allowed to run the test program of an intended test mode selectively among multiple test modes through the simple key operation using the key 12h, key 12g and SET key 12c.

Certain test modes, such as one that clears the contents of NV-RAM, can be initiated by pressing the SET key 12c and thereafter pressing the MODE key 12b, TEST key 12e, SET key 12c and CONT key 12f in this order within the prescribed time length, and accordingly only operators who know this test mode activation rule are allowed to run the test programs of these test modes. Other secure test modes can be accessed by storing different key sequences in the system. In addition, the key sequence for clearing NV-RAM can be modified according to user preference.

The present invention is not confined to the foregoing embodiment, but instead, various modifications are possible within the scope of the invention.

For example, although only one test mode is displayed at once on the display device 13 in the foregoing embodiment, more than one test mode may be displayed. For the selection of an intended test mode out of multiple test modes, numeric keys for example may be used in place of function keys. Although in the foregoing embodiment, the main routine branches to the routine of test mode processing on condition that the printer is turned on while the TEST key 12e is kept pressed, the procedure may be modified such that the routine of test mode processing is initiated in response to the operation of the TEST key 12e within a prescribed time length following the turn-on operation.

What is claimed is:

1. A character printer executing a test mode in accordance with an operator controlled argument N having an initial value, the character printer comprising:

a) means for determining whether a test mode is initiated for the character printer;

b) means for adjusting said argument in accordance with operator key strokes if said test mode is initiated;

c) means for displaying at least one test mode in accordance with said adjusting means; and d) means for initiating a test mode operation in accordance with said argument, said means for initiating a test mode operation including:

means for initiating a special test mode operation, and means for initiating a key ID operation, wherein if said argument has a predetermined value said means for initiating said key ID operation initiates said key ID operation, said means for initiating said key ID operation including means for displaying a sequence of operator prompts prompting the operator to execute predetermined key strokes, wherein if said predetermined key strokes are executed in a predetermined order, a special test mode operation is initiated by said special test mode initiating means.

2. The apparatus of claim 1, wherein said special test mode operation is initiated if said predetermined key strokes are executed in said predetermined order and said predetermined key strokes are executed within a predetermined time.

3. The apparatus of claim 1, further comprising means for terminating said key ID operation, wherein if said predetermined key strokes are not executed in said predetermined order, said terminating means terminates said key ID operation.

4. The apparatus of claim 1, further comprising means for terminating said key ID operation, wherein if said predetermined key strokes are not executed within a predetermined time, said terminating means terminates said key ID operation.

5. The apparatus of claim 1, wherein said means for initiating said special test mode operation comprises means for erasing a nonvolatile memory installed in said character printer.

6. The apparatus of claim 1, wherein said determining means comprises means for determining whether a test key is depressed upon power up of the character printer.

7. The apparatus of claim 1, wherein said determining means comprises means for determining whether a test key is depressed within a predetermined time after power up of the character printer.

8. A method of executing a test mode in a character printer in accordance with an argument N that is controlled by an operator, said argument N having an initial value, the method comprising the steps of:

determining whether a test mode is initiated for the character printer;

adjusting said argument in accordance with operator key strokes if said test mode is initiated;

displaying at least one test mode in accordance with said adjusting step; and initiating a test mode operation in accordance with said argument, wherein if said argument has a predetermined value, said initiating step comprising the step of initiating a key ID operation, said key ID operation comprises the step of displaying a sequence of operator prompts prompting the operator to execute predetermined key strokes, and initiating a special test mode operation if said predetermined key strokes are executed in a predetermined order.

9. A method as claimed in claim 8, wherein said special test mode is initiated if said predetermined key strokes are executed in said predetermined order within a predetermined time.

10. A method as claimed in claim 8, further comprising the step of terminating said key ID operation if said predetermined key strokes are not executed in said predetermined order.

11. A method as claimed in claim 8, further comprising the step of terminating said key ID operation if said predetermined key strokes are not executed within a predetermined time.

12. A method as claimed in claim 8, wherein said step of initiating a special test mode operation comprises the step of erasing a nonvolatile memory installed in said character printer.

13. A method as claimed in claim 8, wherein said determining step comprise the step of determining whether a test key is depressed upon power up of the character printer.

14. A method as claimed in claim 8, wherein said determining step comprises the step of determining whether a test key is depressed within a predetermined time after power up of the character printer.

15. A printer, comprising:

a plurality of function keys;

test program execution means for executing a test program of various test modes provided for a function of said printer;

test mode display means for displaying the test modes in response to operation of a first predetermined function key among said function keys;

test mode selection means for selecting one of the test modes in response to operation of a second predetermined function key among said function keys; and control means for controlling said test program execution means to execute the test program of the test mode selected by said test mode selection means, wherein said test program execution means comprises means for initiating a key ID operation and means for initiating a special test mode, said means for initiating said key ID operation including means for displaying a sequence of operator prompts prompting the operator to execute predetermined key strokes of said function keys, said means for initiating said special test mode initiating said special test mode if said predetermined key strokes are executed in a predetermined order.

16. The printer as claimed in claim 15, wherein said special test mode is initiated if said predetermined key strokes are executed in said predetermined order and within a predetermined time.

17. The printer as claimed in claim 15, further comprising means for terminating said key ID operation, wherein if said predetermined key strokes are not executed in said predetermined order, said terminating means terminates said key ID operation.

18. The printer as claimed in claim 15, further comprising means for terminating said key ID operation, wherein if said predetermined key strokes are not executed within a predetermined time, said terminating means terminates said key ID operation.

19. The printer as claimed in claim 15, wherein said control means controls said test program execution means to execute a test program of a test mode for erasing a nonvolatile memory installed in said printer.

20. The printer as claimed in claim 15, wherein said test mode display means displays the test modes in response to operation of the first predetermined function key simultaneously upon power up of said printer.

* * * * *